US006271712B1

(12) United States Patent
Ball

(10) Patent No.: US 6,271,712 B1
(45) Date of Patent: Aug. 7, 2001

(54) SYNCHRONOUS RECTIFIER AND METHOD OF OPERATION

(75) Inventor: Alan Richard Ball, Gilbert, AZ (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/287,279

(22) Filed: Apr. 7, 1999

(51) Int. Cl.[7] .............................. H01J 19/82; H02M 7/00

(52) U.S. Cl. .......................... 327/531; 327/309; 327/343; 327/102; 363/127

(58) Field of Search ..................................... 327/309, 343, 327/102, 104, 531, 558, 551, 176, 546, 310, 318, 321; 323/283–285, 287; 363/127, 89; 330/258

(56) References Cited

U.S. PATENT DOCUMENTS

| | | | | |
|---|---|---|---|---|
| 4,403,183 | * | 9/1983 | Lueker | 324/72.5 |
| 4,617,473 | * | 10/1986 | Bingham | 327/546 |
| 5,038,266 | * | 8/1991 | Callen et al. | 363/127 |
| 5,510,972 | * | 4/1996 | Wong | 363/127 |
| 5,608,352 | * | 3/1997 | Itakura | 330/253 |
| 5,703,518 | * | 12/1997 | Yamamoto | 327/354 |
| 5,731,694 | * | 3/1998 | Wilcox et al. | 323/287 |
| 5,929,615 | * | 7/1999 | D'Angelo et al. | 323/224 |
| 5,991,182 | * | 11/1999 | Novac et al. | 363/126 |

* cited by examiner

*Primary Examiner*—Terry D. Cunningham
*Assistant Examiner*—Long Nguyen
(74) *Attorney, Agent, or Firm*—Robert D. Atkins; Michael T. Wallace

(57) ABSTRACT

A synchronous rectifier circuit (10) includes a polarity comparator (14) that generates a signal to a driver circuit (16) for controlling the voltage at the gate of a power MOSFET (60). The power MOSFET (60) is switched to operate in the conduction mode and short out a parasitic diode (62) when the diode is forward biased. The power MOSFET (60) is switched to operate in the nonconduction mode when the parasitic diode (62) is reverse biased. A bias supply circuit (12) uses a capacitor (70) to generate a regulated internal bias that provides power to the polarity comparator (14) and to the driver circuit (16). The internal bias allows the power MOSFET (60) to provide a current conduction that is substantially isolated from the changes in voltage levels at the terminals (64, 66) of the synchronous rectifier circuit (10).

15 Claims, 2 Drawing Sheets

12 68 64 36 32 42 38 40 34 50 56 18 22 47 60 62 70 30 44 54 58 28 48 20 49 52 26 46 24 66 66 14 16

10

SYNCHRONOUS RECTIFIER AND METHOD OF OPERATION

BACKGROUND OF THE INVENTION

The present invention relates, in general, to rectifier circuit and, more particularly, to synchronous rectifier circuits.

Electronic devices such as microprocessors now operate with lower power supply ranges and higher currents than in the past. Synchronous rectifiers provide an efficient way of generating the required low operating voltages and high currents for the electronic devices. Synchronous rectifier circuits are used in forward converters, flyback converters, buck converters, push-pull converters, and half-bridge converters, among others. In forward switching power supply circuits employing synchronous rectifiers, the secondary side diodes are replaced by power transistors to obtain a lower on-state voltage drop. The synchronous rectifier uses N-channel MOSFETs rather than diodes to avoid the turn on voltage drop of diodes which can be significant for low output voltage power supplies. The transistors are biased to conduct from source-to-drain (for an N-channel power MOSFET) when a diode would have been conducting from anode to cathode, and conversely, are gated to block voltage from drain-to-source when a diode would have been blocking from cathode to anode.

In these synchronous rectifier circuits, the gate signals to the transistors must be synchronized as close as possible to the inflection points of the output current, which inflection points correspond to the zero crossings of the squarewave output voltage. The gate signals can be self-driven, i.e., the gate signal can be tied directly to the circuit, or controlled-synchronized, i.e., the synchronizing signal is derived from some point in the circuit and fed to the MOSFET gate driver. Typically, the synchronous rectifiers require auxiliary windings or additional connections to provide information to the synchronous rectifier circuit. The auxiliary winding or additional connection adds cost to the synchronous rectifier circuit solution.

Hence, a need exists for a synchronous rectifier that has a wide band of frequency operation, and maintains a minimum number of external pin connections. It would be of further advantage for the synchronous rectifier to be integrated and have reduced costs.

DETAILED DESCRIPTION OF THE PREFERRED EMBODIMENT

Figure 1:
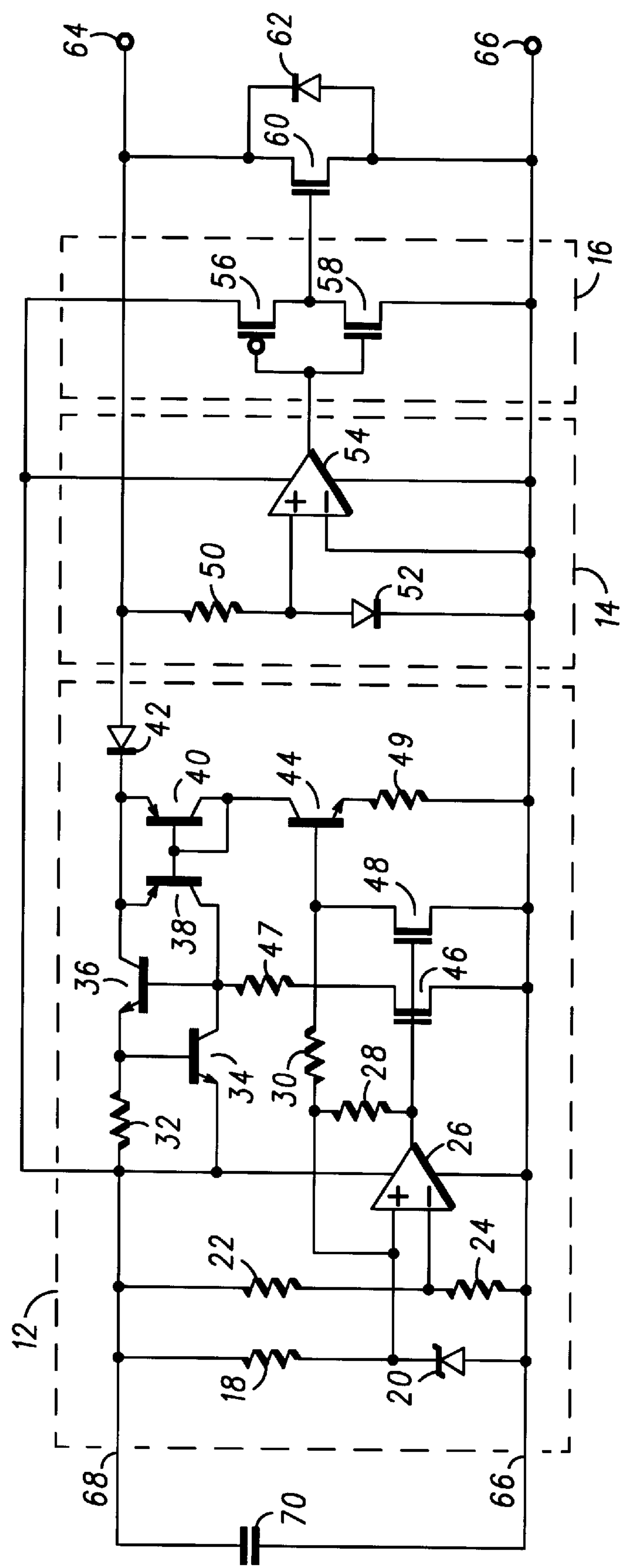
FIG. 1 is a schematic diagram of a synchronous rectifier circuit having a power FET connected between two terminals.

FIG. 1 is a schematic diagram of a synchronous rectifier circuit 10. Synchronous rectifier circuit 10 includes a bias supply circuit 12 that generates a bias voltage for a polarity comparator 14 and a driver circuit 16. In the preferred embodiment, bias supply circuit 12, polarity comparator 14, and driver circuit 16 are fabricated as a four terminal integrated circuit. The integrated circuit has terminals 64, 66, 68, and a buffered output for driving a power transistor. The integrated circuit, when combined with an external capacitor 70 and a power Metal Oxide Semiconductor Field Effect Transistor (MOSFET) 60, form a hybrid synchronous rectifier circuit 10 in a two terminal package. In this embodiment, terminals 64 and 66 are referred to as external electrical connections.

In another embodiment, bias supply circuit 12, polarity comparator 14, driver circuit 16, and MOSFET 60 could be integrated and then combined with the external capacitor 70 to form synchronous rectifier circuit 10. In this embodiment, synchronous rectifier circuit 10 would be a three pin hybrid that includes the integrated circuit connected to the external capacitor. Alternatively, a fabrication process having a high dielectric constant oxide would allow integration of capacitor 70 onto a semiconductor substrate along with bias supply circuit 12, polarity comparator 14, driver circuit 16, and MOSFET 60. In this embodiment, synchronous rectifier circuit 10 would be a two terminal device, e.g., with terminals 64 and 66 as external electrical connections.

Bias supply circuit 12 has two inputs, the first input being connected to terminal 64 for receiving a signal and the second input being connected to terminal 66. The output of bias supply circuit 12 supplies an operating voltage from terminal 68. Bias supply circuit 12 includes a comparator 26 having a noninverting input that is commonly connected to a first terminal of a resistor 18 and to a cathode of a Zener diode 20. Resistor 18 has a resistance value of about 2.2 kilohms and Zener diode 20 has a reverse voltage of about 1.2 volts. Comparator 26 has an inverting input that is commonly connected to a first terminal of a resistor 22 and a first terminal of a resistor 24. Resistors 22 and 24 have resistance values of about 6.8 kilohms and 2.2 kilohms, respectively. The second terminals of resistors 18 and 22 are connected through a power conductor to terminal 68, while the second terminal of resistor 24 and the anode of Zener diode 20 are connected through another power conductor to terminal 66. Comparator 26 receives a positive operating voltage from terminal 68 and a negative operating voltage from terminal 66.

Bias supply circuit 12 further includes a switch that is controlled by a signal generated at the output of comparator 26. The switch provides a controllable current conduction path that couples the cathode of a diode 42 to terminal 68. The switch is used for controlling the charge placed on capacitor 70. The switch includes transistors 34, 36, 38, 40, 44, 46, and 48. In the preferred embodiment, transistors 34, 36, and 44 are NPN transistors, transistors 38 and 40 are PNP transistors, and transistors 46 and 48 are N-channel MOSFETs. Bipolar transistors have a base terminal that is also referred to as a control terminal, and collector and emitter terminals that are referred to as current carrying terminals or conduction terminals. MOSFETs have a gate terminal that is also referred to as a control terminal, and source and drain terminals that are referred to as current carrying terminals or conduction terminals. The anode of diode 42 is connected through a power conductor to terminal 64.

Transistors 38 and 40 form a current mirror having emitter terminals that are connected to each other, to the collector terminal of transistor 36, and to the cathode of diode 42. The base terminals of transistors 38 and 40 are connected to each other and further connected to the collector terminals of transistors 40 and 44. The collector terminals of transistors 34 and 38 are connected to each other, connected to the base terminal of transistor 36, and coupled to a drain terminal of transistor 46 via a resistor 47. Resistor 47 has a resistance value of about 600 ohms. The emitter terminal of transistor 36 is connected to the base terminal of transistor 34 and to a first terminal of a resistor 32. Resistor 32 has a resistance value of about 8 kilohms. The emitter of transistor 34 and the second terminal of resistor 32 are connected to terminal 68.

Further, the emitter terminal of transistor 44 is coupled to terminal 66 through a resistor 49, having a resistance value of about 120 ohms. The base terminal of transistor 44 is connected to the drain terminal of transistor 48 and to a first terminal of a resistor 30. Resistor 30 has a resistance value of about 1 kilohm. The second terminal of resistor 30 is connected to the noninverting input of comparator 26 and further coupled to the output of comparator 26 via resistor 28, having a resistance value of about 100 kilohms. The base terminals of transistors 46 and 48 are connected to the output of comparator 26. The source terminals of transistors 46 and 48 are connected to terminal 66.

Polarity comparator 14 includes a comparator 54 having a noninverting input that is commonly connected to a first terminal of a resistor 50 and to an anode of a diode 52 for generating a clamping voltage. Resistor 50 has a resistance value of about 33 kilohms. Comparator 54 has an inverting input that is connected through a power conductor, along with the cathode of diode 52, to terminal 66. The second terminal of resistor 50 is connected through a power conductor to terminal 64. Comparator 54 receives a positive operating voltage from terminal 68 at a power input, a negative operating voltage from terminal 66 at another power input, and provides the output for polarity comparator 14.

Driver circuit 16 is an inverter that includes a P-channel MOSFET 56 and an N-channel MOSFET 58 having commonly connected gate terminals connected to the output of polarity comparator 14. The source terminal of transistor 56 is connected through the power conductor to terminal 68, while the source terminal of transistor 58 is connected through a power conductor to terminal 66. The drain terminal of transistor 56 is connected to the drain terminal of transistor 58, the common connection forming the output of driver circuit 16.

The output stage of synchronous rectifier circuit 10 includes a power N-channel MOSFET 60 having a gate terminal connected to the output of driver circuit 16. The drain terminal of MOSFET 60 is connected to terminal 64 and the source terminal is connected to terminal 66. In forming transistor 60, a parasitic body diode 62 is also formed, having a cathode connected to the drain of MOSFET 60 and an anode connected to the source terminal of MOSFET 60.

Figure 2:
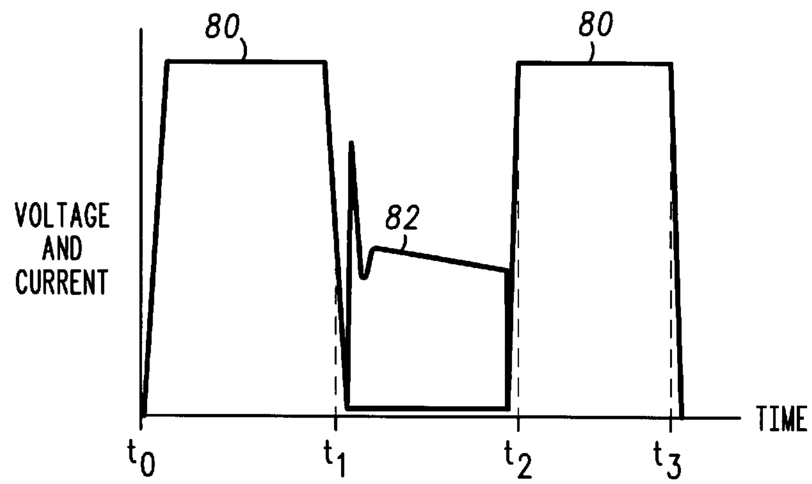
FIG. 2 is a plot that illustrates the drain-to-source voltage and the conduction current of the power FET of FIG. 1.

FIG. 2 is a plot that includes waveform 80 for illustrating the drain-to-source voltage of power MOSFET 60 and waveform 82 for illustrating the drain-to-source current conducted through the transistor. The vertical axis represents the voltage amplitude for waveform 80 and a current amplitude for waveform 82. The horizontal axis represents time. Waveform 80 is shown transitioning from a low voltage value to a high voltage value at time to and transitioning from a high voltage value to a low voltage value at time $t_1$ to complete one cycle of the signal supplied at terminal 64 (see FIG. 1). Waveform 82 shows that MOSFET 60 conducts a current when waveform 80 is a low voltage.

Figure 3:
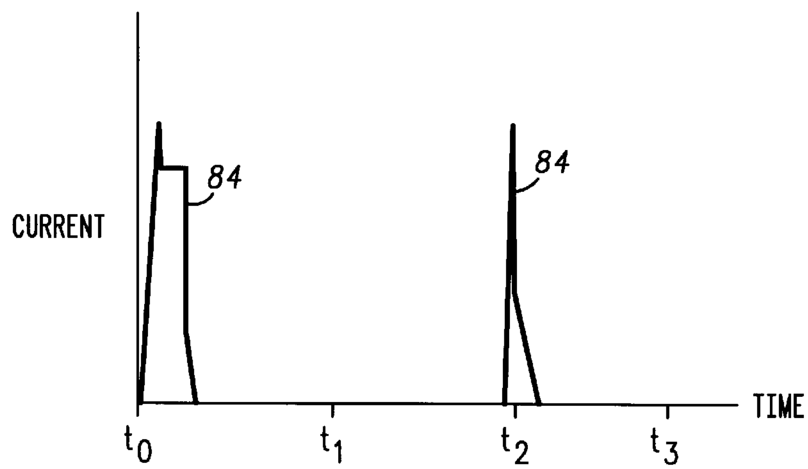
FIG. 3 is a plot that illustrates the current being supplied through a switch for charging a capacitor.

FIG. 3 is a plot that illustrates the current being supplied through the switch for charging capacitor 70 (see FIG. 1). The vertical axis represents a current and the horizontal axis represents time. As shown, current from terminal 64 is supplied through transistor 36 (see FIG. 1) at times to and $t_2$ for charging capacitor 70. Waveform 84 shows a wider current pulse at time to than the current pulse at time $t_2$. Thus, capacitor 70 receives more charge at time to that at time $t_2$. Bias supply circuit 12 does not supply current through transistor 36 for charging capacitor 70 at times $t_1$ and $t_3$.

Figure 4:
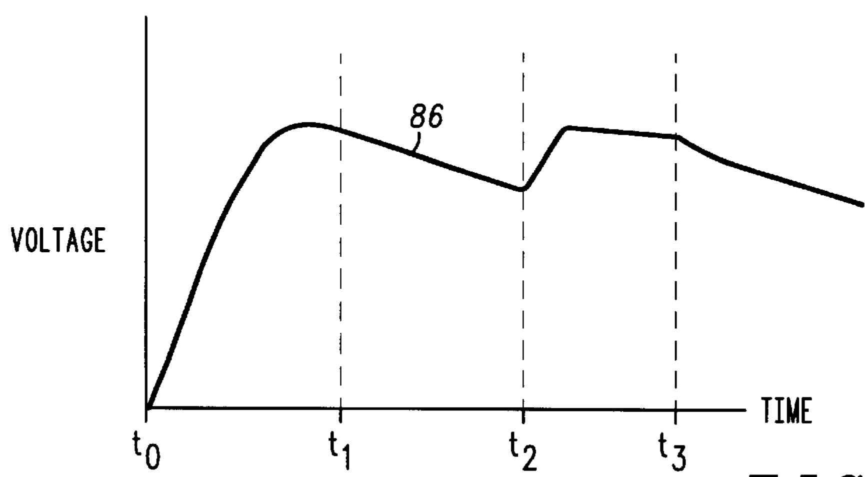
FIG. 4 is a plot that illustrates the voltage across the terminals of the capacitor.

FIG. 4 is a plot that illustrates the voltage at terminal 68 (see FIG. 1) that is generated by charging capacitor 70. The vertical axis represents voltage and the horizontal axis represents time. Referring to FIGS. 1 and 4, waveform 86 shows that the voltage across capacitor 70 is substantially increased between the times $t_0$ and $t_1$, decreased between the times $t_1$ and $t_2$, and increased again between the times $t_2$ and $t_3$. Between times $t_0$ and $t_1$, diode 42 is forward biased and current is supplied through transistor 36 from terminal 64 to terminal 68 and capacitor 70. Waveform 86 shows that the voltage at terminal 68 is increased between times $t_0$ and $t_1$ as capacitor 70 is charged. Between times $t_1$ and $t_2$, diode 42 is reverse biased and current is not supplied from terminal 64 to terminal 68. Waveform 86 shows that the voltage at terminal 68 is decreased between times $t_1$ and $t_2$ as polarity comparator 14 and driver circuit 16 use charge stored on capacitor 70. Between times $t_2$ and $t_3$, diode 42 is forward biased and current is again supplied through transistor 36 from terminal 64 to terminal 68 and capacitor 70. Typically, a voltage of about 10 volts is developed at terminal 68, however, this is not a limitation of the present invention. It should be noted that the present invention can be used to provide lower voltages at terminal 68 to keep in step with the future trends for lower operating voltages. The voltage at terminal 68 is used to supply the positive operating voltage for polarity comparator 14 and driver circuit 16.

In operation, the signal received at terminal 64 has a waveform that typically ranges in amplitude from about 5 volts to 25 volts and a frequency that ranges from about 50 kilohertz to 400 kilohertz. With capacitor 70 charged and supplying power to polarity comparator 14 and driver circuit 16, comparator 54 determines the time at which MOSFET 60 is switched between the conductive and nonconductive modes. Referring to FIGS. 1 and 2, waveform 80 shows that the voltage at terminal 64 is positive with respect to the voltage at terminal 66 between the times $t_0$ and $t_1$ and between the times of $t_2$ and $t_3$. The inverting input of comparator 54 is referenced to terminal 66 and the noninverting input receives a positive voltage of several hundreds of millivolts, causing the output of comparator 54 to transition high. Driver circuit 16 inverts the signal received at the input and supplies a logic zero at the output, which causes MOSFET 60 to be nonconducting. Thus, during the times $t_0$ and $t_1$ between the times of $t_2$ and $t_3$, diode 62 is reverse biased and nonconducting.

Between the times $t_1$ and $t_2$, on the other hand, waveform 80 in FIG. 2 shows that the voltage at terminal 64 is negative with respect to the voltage at terminal 66. The inverting input of comparator 54 is referenced to terminal 66 and the noninverting input receives a negative voltage of several hundreds of millivolts, causing the output of comparator 54 to transition low. Driver circuit 16 inverts the signal received at the input and supplies a logic one at the output, which causes MOSFET 60 to be conducting. In other words, the logic one value exceeds the gate-to-source threshold voltage of MOSFET 60, causing the transistor to conduct a high current from the drain terminal to the source terminal. Waveform 82 of FIG. 2 shows the drain-to-source current of MOSFET 60 which conducts a current in the range of about 20 to 25 amps. The "on" resistance of MOSFET 60 is typically less than 25 milliohms, causing MOSFET 60 to function as a low resistance electrical conduction path across the terminals of diode 62. In this condition, the voltage across terminals 64 and 66 is not determined by a forward bias of diode 62, but rather by the "on" resistance of MOSFET 60.

Polarity comparator 14 and driver circuit 16 are capable of quickly responding to voltage changes at terminals 64 and 66 that cause diode 62 to switch between a forward bias and a reverse bias. Thus, the time delay of comparator 54 and the time delay of the inverter formed by MOSFETs 56 and 58 is short in order for MOSFET 60 to be appropriately switched between the conductive and nonconductive modes.

The energy stored in capacitor 70 provides a regulated internal power supply within synchronous rectifier circuit 10 that is used to control the conduction of current through MOSFET 60. The internal power supply developed by bias supply circuit 12 and capacitor 70 allows the flexibility of placing synchronous rectifier circuit 10 within another circuit in a variety of locations. Referring to FIGS. 1 and 2, diode 42 in bias supply circuit 12 isolates capacitor 70 and prevents the capacitor from discharging when the voltage at terminal 64 is switched low between the times $t_1$ and $t_2$.

Transistors 38 and 40 are configured as a current mirror, with transistor 38 sized to provide the base current to transistor 36. At times $t_0$ and $t_2$, waveform 80 (see FIG. 4) transitions to a positive voltage and diode 42 (see FIG. 1) is forward biased. Waveform 84 in FIG. 3 illustrates the collector current that is conducted by transistor 36 to charge capacitor 70. Transistor 34 and resistor 32 limit the current, for example, that is conducted by transistor 36 to about 100 milliamps. At a current of about 100 milliamps, the voltage developed across resistor 32 is sufficient to cause transistor 34 to conduct base current away from transistor 36 and, thereby, limit the peak current conducted by transistor 36.

Comparator 26 controls whether transistor 36 is conductive or nonconductive. Comparator 26 receives a reference voltage at the noninverting input that is set by resistor 18 and Zener diode 20. The reference voltage has a value, for example, of about 1.25 volts. Comparator 26 receives another voltage at the inverting input that is set by resistors 22 and 24 and the charge on capacitor 70, i.e., the voltage at terminal 68. When the voltage at the inverting input of comparator 26 is less than the reference voltage at the noninverting input, then the signal at the output of comparator 26 is a logic zero value. In this case, the logic zero value is below the threshold voltage of transistors 46 and 48, causing the transistors to be nonconductive. Transistor 36 receives the base current from transistor 38 and conducts collector current for charging capacitor 70.

On the other hand, when the voltage at the inverting input of comparator 26 is greater than the reference voltage at the noninverting input, then the signal at the output of comparator 26 is a logic one value. The logic one value is above the threshold voltage of transistors 46 and 48, causing the transistors to be conductive. Transistor 46 conducts the current supplied by transistor 38 away from the base terminal of transistor 36 and supplies that current to terminal 66. In this case, transistor 36 is nonconductive and capacitor 70 does not receive additional charge. Further, transistor 48 pulls the base terminal of transistor 44 low, causing transistor 44 to be nonconductive. In turn, the base terminal of transistors 38 and 40 are pulled high, causing transistors 38 and 40 to also be nonconductive. Thus, transistor 38 does not supply base current to transistor 36 which further ensures that transistor 36 is nonconductive. When transistor 36 is nonconductive, no current is transferred from terminal 64 to terminal 68 for charging capacitor 70.

The internal bias that is generated by bias supply circuit 12 allows the voltage at the gate terminal of transistor 60 to be substantially isolated from the changes in voltage at terminals 64 and 66. The voltage generated at terminal 68 supplies the positive operating voltage for polarity comparator 14 and driver circuit 16. Thus, when polarity comparator 14 and driver circuit 16 provide a logic one value to the gate terminal of MOSFET 60, the amplitude of the logic one value is relatively constant over an accepted range of voltages received at terminal 64.

In contrast to prior art synchronous rectifiers, the present invention does not require auxiliary windings or additional connections to provide information to synchronous rectifier circuit 10. Synchronous rectifier circuit 10 can be used by properly connecting terminals 64 and 66 into either the primary or the secondary side of a transformer (not shown). Synchronous rectifier circuit 10 can be configured as a forward converter, flyback converter, buck converter, push-pull converter, half-bridge converter, among others. One inventive feature of the present invention allows synchronous rectifier circuit 10 to be used in another circuit without referencing synchronous rectifier circuit 10 to a ground pin.

By now it should be appreciated that a synchronous rectifier circuit has been provided that has a wide band of frequency operation and can be placed in a variety of circuit locations. The synchronous rectifier circuit can be fully integrated or manufactured as a hybrid. Neither the fully integrated version nor the hybrid version require external components.

What is claimed is:

1. A synchronous rectifier coupled to receive an input signal and providing a charge signal to maintain an operating signal at a predetermined level, the synchronous rectifier comprising:

a bias generator including, (a) a first comparator having a first input coupled to receive the operating signal, a second input coupled to receive a reference signal indicative of the predetermined level, a power supply input coupled to receive the operating signal, and an output coupled to provide a charge control signal when the operating signal is below the predetermined level; and (b) a current switch having a control input coupled to receive the charge control signal and an output coupled to provide the charge signal in response to the charge control signal when the input signal is above the operating signal; and a polarity detection circuit having a power supply input coupled to receive the operating signal, an input coupled to receive the input signal and an output coupled to provide a drive signal in response to a polarity of the input signal.

2. The synchronous rectifier of claim 1 wherein the current switch comprises:

a current mirror having a first terminal coupled to receive the input signal and a second terminal coupled to provide a bias signal;

a first transistor having a control terminal coupled to receive the bias signal and a conduction terminal coupled to provide the charge signal when the input signal is above the predetermined level; and a second transistor having a conduction terminal coupled to receive the bias signal and a control terminal coupled to receive the charge control signal when the operating signal is above the predetermined level to remove the charge signal.

3. The synchronous rectifier of claim 1 wherein the polarity detection circuit comprises:

a second comparator having a power supply input coupled to receive the operating signal, a first input coupled to receive the input signal and an output coupled to provide a signal indicative of the polarity of the input signal; and a buffer having an input coupled to receive the output of the comparator and coupled to provide the drive signal.

4. A synchronous rectification circuit coupled to maintain a substantially constant output signal at a predetermined level in response to an input signal operating at first and second polarities, the synchronous rectification circuit comprising:

a charging circuit including, (a) a first comparator having a first input coupled to receive a reference signal indicative of the predetermined level, a second input coupled to receive the output signal, a power supply input coupled to receive the output signal and an output coupled to provide a control signal; and (b) a current switch having a control terminal coupled to receive the control signal, a first conduction terminal coupled to receive the input signal and a second conduction terminal coupled to provide a charging signal when the input signal is at the first polarity; and a polarity detection circuit coupled to receive the input signal and coupled to provide a signal indicative of the polarity of the input signal.

5. The synchronous rectification circuit of claim 4 wherein the current switch comprises:

a current mirror having a first terminal coupled to receive the input signal and a second terminal coupled to provide a bias signal;

a first transistor having a control terminal coupled to receive the bias signal and coupled to provide the charging signal when the input signal is above the predetermined level; and a second transistor having a conduction terminal coupled to receive the bias signal and a control terminal coupled to receive the control signal when the output signal is above the predetermined level to remove the charging signal.

6. The synchronous rectification circuit of claim 4 wherein the polarity detection circuit comprises a second comparator having a power supply input coupled to receive the output signal, a first input coupled to receive the input signal and an output coupled to provide the signal indicative of the polarity of the input signal.

7. In an integrated circuit, a synchronous rectifier receiving an input signal at first and second pins of the integrated circuit and providing a charging signal at a third pin of the integrated circuit to maintain an output signal at a predetermined level, the synchronous rectifier comprising:

a bias supply circuit including, (a) a first comparator coupled to receive the output signal and a reference signal indicative of the predetermined level having a power supply input coupled to receive the output signal and having an output coupled to provide a charging control signal when the output signal is below the predetermined level; and (b) a current switch having a control terminal coupled to receive the charging control signal, a first conduction terminal coupled to receive the input signal and a second conduction terminal coupled to provide the charging signal; and a conduction control circuit coupled to the first and second pins receiving the input signal at a first polarity and blocking the input signal at a second polarity.

8. The synchronous rectifier of claim 7 wherein the current switch comprises:

a current mirror having a first terminal coupled to receive the input signal and a second terminal coupled to provide a bias signal;

a first transistor having a control terminal coupled to receive the bias signal and coupled to provide the charging signal when the input signal is above the predetermined level; and a second transistor having a conduction terminal coupled to receive the bias signal and a control terminal coupled to receive the control signal when the output signal is above the predetermined level.

9. The synchronous rectifier of claim 7 wherein the conduction control circuit comprises;

a second comparator having a power supply input coupled to receive the output signal and a first input coupled to receive the input signal; and a switch having a first conduction terminal coupled to the first pin, a second conduction terminal coupled to the second pin and a control terminal coupled to receive an output of the comparator wherein the switch is open in response to the first polarity and closed in response to the second polarity.

10. The synchronous rectifier of claim 9 wherein the switch includes a transistor.

11. A method of operating a synchronous rectification circuit to maintain a predetermined output signal level in response to an alternating input signal at first and second polarities, the method comprising:

using a current switch to provide a charging signal in response to the first polarity;

using a comparator to regulate the charging signal to maintain the predetermined output signal level substantially independent of an input signal level, wherein the comparator is coupled to receive the predetermined output signal at a power supply input; and providing a control signal to limit the alternating input signal to a first level in response to the second polarity.

12. The method of claim 11 wherein providing the charging signal compromises activating the current switch when an output signal is below the predetermined output signal level.

13. The method of claim 11 wherein regulating the charging signal comprises:

comparing the output signal to the predetermined output signal level;

providing the charging signal when the output signal is below the predetermined output signal level; and blocking the charging signal when the output signal is above the predetermined output signal level.

14. A method of operating a synchronous rectifier to maintain a substantially constant output signal substantially independent of an alternating input signal, comprising:

receiving the alternating input signal at first and second polarities;

using a comparator to provide a control signal when the output signal is less than a predetermined level, wherein the comparator is coupled to receive the output signal at a power supply input;

using a current switch to provide a charging signal in response to the control signal during the first polarity of the input signal; and clamping the second polarity of the input signal to a first level.

15. The method of claim 14 wherein providing the charging signal comprises:

producing the charging signal during the first polarity of the input signal;

comparing the output signal to the predetermined level; and supplying the charging signal to a charging node when the output signal is below the predetermined level.

* * * * *